(12) United States Patent
Vigolo (10) Patent No.: US 10,995,434 B2
(45) Date of Patent: May 4, 2021

(54) REINFORCED FLEXIBLE HOSE, PROCESS FOR MAKING SAME AS WELL AS PRODUCTION LINE FOR MANUFACTURING THEREOF

(71) Applicant: FITT S.P.A., Sandrigo (IT)

(72) Inventor: Valentino Vigolo, Caldogno (IT)

( * ) Notice: Subject to any disclaimer, the term of this patent is extended or adjusted under 35 U.S.C. 154(b) by 13 days.

(21) Appl. No.: 16/476,285

(22) PCT Filed: Dec. 21, 2017

(86) PCT No.: PCT/IB2017/058257
§ 371 (c)(1),
(2) Date: Jul. 6, 2019

(87) PCT Pub. No.: WO2018/130895
PCT Pub. Date: Jul. 19, 2018

(65) Prior Publication Data
US 2019/0360133 A1    Nov. 28, 2019

(30) Foreign Application Priority Data
Jan. 12, 2017    (IT) ......................... 102017000002927

(51) Int. Cl.
*F16L 11/08* (2006.01)
*D04B 15/32* (2006.01)
*D04B 9/44* (2006.01)
*D04B 39/00* (2006.01)

(52) U.S. Cl.
CPC ............... *D04B 15/32* (2013.01); *D04B 9/44* (2013.01); *D04B 39/00* (2013.01); *F16L 11/086* (2013.01)

(58) Field of Classification Search
CPC .......... F16L 11/02; F16L 11/10; F16L 11/085; F16L 11/086; D04B 1/225; D04B 21/205; D04B 39/04
USPC ........ 138/123–126, 137, 129, 130; 428/36.9, 428/36.91
See application file for complete search history.

(56) References Cited

U.S. PATENT DOCUMENTS

| 1,644,116 A | 10/1927 | Fefel |
| 2,126,250 A | 8/1938 | Ford |
| 2,234,671 A | 3/1941 | Ford |
| 2,788,804 A * | 4/1957 | Larkin .................. D04B 1/225 138/125 |

(Continued)

FOREIGN PATENT DOCUMENTS

| FR | 2849148 A3 * | 6/2004 | ............. D04B 39/04 |
| WO | 2010052657 | 5/2010 | |

*Primary Examiner* — Patrick F Brinson
(74) *Attorney, Agent, or Firm* — Themis Law (57) ABSTRACT

A flexible hose reinforced with at least two superimposed textile layers includes an inner load-bearing tubular layer defining a longitudinal axis and made of a first polymeric or elastomeric material, an outer cover layer made of a second polymeric or elastomeric material, and a first and a second reinforced textile layer mutually superimposed and interposed between the inner and outer layers. The first and the second textile layers are both knitted textile layers with tricot chain stitches having courses of stitches and rows of stitches, the courses of stitches being substantially parallel to each other and to the longitudinal axis, the rows of stitches having opposite inclinations with respect to the longitudinal axis. A production line and a method of manufacturing such hose.

14 Claims, 5 Drawing Sheets

(56) References Cited

U.S. PATENT DOCUMENTS

| | | | | |
|---|---|---|---|---|
| 2,870,619 | A | * | 1/1959 | Greczin ................ F16L 11/085 66/169 R |
| 3,253,618 | A | * | 5/1966 | Cook ...................... F16L 57/00 138/125 |
| 3,779,308 | A | * | 12/1973 | Buhrmann ............ F16L 11/085 165/51 |
| 4,044,799 | A | * | 8/1977 | Higbee ................. B29C 44/322 138/125 |
| 5,477,888 | A | * | 12/1995 | Mezzalira .............. D04B 1/225 138/125 |
| 6,199,594 | B1 | * | 3/2001 | Mezzalira ............ D04B 21/205 138/130 |
| 10,125,902 | B2 | * | 11/2018 | Chiang ................ F16L 11/125 |
| 10,774,955 | B2 | * | 9/2020 | Gopalan ................ C08F 255/04 |
| 2011/0209791 | A1 | * | 9/2011 | Mezzalira ............ F16L 11/085 138/126 |
| 2012/0042980 | A1 | * | 2/2012 | Mezzalira ............... B32B 5/026 138/137 |
| 2013/0092276 | A1 | * | 4/2013 | Caneva ................ D04B 21/205 138/123 |
| 2014/0110013 | A1 | * | 4/2014 | Mezzalira ................ D04B 9/44 138/124 |

* cited by examiner

FIG. 9

REINFORCED FLEXIBLE HOSE, PROCESS FOR MAKING SAME AS WELL AS PRODUCTION LINE FOR MANUFACTURING THEREOF

FIELD OF THE INVENTION

The present invention generally regards the technical field of flexible hoses, and it particularly regards a method and a line for manufacturing a flexible hose reinforced with at least two superimposed textile layers.

The invention also regards a reinforced flexible hose that can be manufactured through the aforementioned method and line.

DEFINITIONS

In the present document, the expression "textile layer" or its derivatives is used to indicate a layer consisting of at least one textile yarn arranged on a layer that supports it. Preferably, the "textile layer" may be arranged on the layer which supports it so as to leave the portions thereof—generally square-shaped, rectangular-shaped or rhomboid-shaped—free.

In the present document, the expression "textile yarn" or its derivatives is used to indicate an elongated thread-like element of any shape and made of any material, as long as the dimension of the length considerably prevails over the others. For example, the textile yarn may be a polymeric yarn, which may have a unitary structure or it may in turn consist of the joining of several elementary yarns, or a textile band of any shape.

In the present document, the expression "spiraled textile layer" or "spiraling" or its derivatives is used to indicate a layer consisting of a single yarn spiral-wound on the load-bearing layer with a predetermined pitch or groups of yarns spiral-wound on the load-bearing layer not superimposed on each other and preferably parallel.

In the present document, the expression "cross-hatched textile layer" or "cross-hatching" or its derivatives is used to indicate a layer consisting of at least two yarns or groups of yarns spiral-wound on the load-bearing layer with opposite inclinations and mutually superimposed but not connected. Thus, a cross-hatching consists of two or more superimposed spiralings.

In the present document, the expression "braided textile layer" or "braiding" or its derivatives is used to indicate a layer consisting of at least two yarns of groups of yarns arranged on the load-bearing layer with opposite inclinations and mutually connected alternatingly to form a braid. In a braiding, a yarn intertwines with another one once above and subsequently below it. The braiding is also referred to as woven, depending on the inclination.

In the present document, the expression "knotted textile layer" or "knotting" or its derivatives is used to indicate a layer consisting of at least two yarns or groups of yarns arranged on the load-bearing layer with opposite inclinations and mutually connected by means of one or more knots. In a knotting, a yarn cannot slide with respect to another due to the constraint consisting of the knots.

In the present document, the expression "knitted textile layer with chain stitches of the tricot type" and the like is used to indicate a layer consisting of at least two yarns or groups of yarns arranged on the load-bearing layer and mutually intertwined to form a plurality of chain stitches of the "tricot" type.

In the present document, the expression "chain stitches of the tricot type" and the like is used to indicate the portion of a textile yarn (or a set of yarns grouped in a single yarn) which is intertwined with adjacent yarns to form a generally annular-shaped loop.

In the present document, the expression "row of stitches" and the like of a knitted textile layer with chain stitches of the tricot type is used to indicate the line defined by the "chain stitches of the tricot type" concatenated to each other.

In the present document, the expression "courses of stitches" and the like of a knitted textile layer with chain stitches of the tricot type is used to indicate the portion of a textile yarn (or set of yarns grouped into a single yarn) mutually connecting two consecutive "chain stitches of the tricot type" along the same yarn.

In the present document, the expression "compatible materials" or its derivatives is used to indicate materials that are chemically/physically compatible with each other, i.e. materials that, once coupled, form a joint suitable to support the transfer of pulling or cutting forces through the contact surfaces. Thus, the maximum compatibility will be observed in identical materials or materials having matrices of the same base.

In the present document, the expression "matrix" of a polymer or its derivatives is used to indicate a polymeric material capable of conferring the molecular structure to the finished product.

In the present document, the expression "matrix based on" or its derivatives followed by the name of a given polymeric material is used to indicate a polymeric material capable of conferring the molecular structure of the given polymeric material, whose name follows the phrase "matrix based on", to the finished product.

In the present document, the expression "providing" or its derivatives is used to indicate the preparation of an element of interest to a step of interest, thus including any preventive treatment aimed at the optimal execution of the step of interest, from simple collection and possible storage to heat and/or chemical and/or physical treatments and the like.

In the present document, unless otherwise specified, the expression "inclination" or its derivatives of a textile layer or part thereof is used to indicate the inclination of the textile layer or part thereof with respect to the axis of the hose.

STATE OF THE ART

Flexible hoses with a single textile layer, comprising an inner layer susceptible to come into contact with the liquid to be transferred, an outer layer susceptible to be grasped by a user and, interposed therebetween, a textile layer with chain stitches of the tricot type, are known.

The European patent EP-B1-0623776, on behalf of the Applicant, discloses an example of such hose, in which the rows of stitches and courses of stitches of the textile layer have mutually opposite inclinations with respect to the axis of the hose.

Besides having good anti-torsional properties and relatively high burst pressure, such hose is also simple and quick to manufacture. An example of a machine suitable to manufacture such hose is disclosed by the Italian patent number IT1270776, on behalf of the Applicant.

Flexible hoses with double knitted textile layer, comprising a pair of textile layers with stitches of the tricot type, mutually superimposed and interposed between the inner and outer layer, are also known. An example of such hoses is disclosed by EP-B1-1156252, in which the rows of stitches and courses of stitches of both textile layers have mutually opposite inclinations with respect to the axis of the hose. An example of a machine suitable to manufacture a hose of this type is disclosed by FR2793866.

Though having good anti-torsional and higher burst pressure properties with respect to a hose with a single textile layer, a disadvantage of such prior art hose lies in a particular manufacturing difficulty and relatively low production speed.

In particular, the manufacturing of a hose with a double knitted textile layer is complicated further by the fact that the hose, advancing continuously on the knotting heads, tends to rotate around its own axis due to the extremely strong vibrations of the knitting heads.

This implies a non-homogeneous distribution of the textile layers on the hose, which requires frequently stopping the machine to manually correct the position of the hose or of the stitches so as to overcome this problem, with ensuing performance drop over the entire production line.

Such disadvantage is particularly disadvantageous given that the manufacturing of textile layers is usually the slowest step of a hose manufacturing process, thus delays in this step seriously affect the entire production line.

Furthermore, a non-homogeneous distribution of the courses and rows of stitches implies the hazard of local collapses of the hose when subject to internal pressure.

Another drawback observed when it comes to manufacturing prior art flexible hoses reinforced with a double textile layer lies in the need for frequent maintenance interventions on the knitting unit, due to the fact that the aforementioned units have various rotating components.

SUMMARY OF THE INVENTION

An object of the invention is to at least partly overcome the drawbacks outlined above, by providing a flexible hose reinforced with at least two highly efficient and relatively inexpensive textile layers.

Another object of the invention is to provide a flexible hose reinforced with at least two textile layers obtainable in a relatively simple and quick manner.

Another object of the invention is to provide a flexible hose reinforced with at least two textile layers wherein the latter are distributed in a homogeneous fashion.

Another object of the invention is to provide a flexible hose reinforced with at least two textile layers with relatively high burst pressure.

Another object of the invention is to provide a flexible hose reinforced with at least two textile layers with optimal anti-torsional properties.

Another object of the invention is to provide a flexible hose reinforced with at least two textile layers that can be manufactured continuously and without interruptions.

These and other objects that will be more apparent hereinafter, are attained by a line, a method and a reinforced flexible hose according to what is described, illustrated and/or claimed herein.

Advantageous embodiments of the invention are defined according to the dependent claims.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF A PREFERRED EMBODIMENT

With reference to the aforementioned figures, the flexible hose according to the invention, indicated in its entirety with reference number 1, may be particularly useful for transferring any liquid or fluid, in particular for transferring water, preferably potable water.

The flexible hose 1 may be made up of an inner load-bearing tubular layer 2, which may for example be made of plasticised PVC or elastomer or thermoplastic elastomer (TPE), an outer cover tubular layer 3, which for example may still be made of plasticised PVC or elastomer or thermoplastic elastomer (TPE) and, interposed therebetween, a first and a second textile layer 4, 5, mutually superimposed, which for example may be made of polyester yarn.

The inner load-bearing tubular layer 2, which may define the axis X of the hose 1, may be designated to come into contact with the liquid to be transferred, while the outer cover layer 3 may be designated to be grasped by a user.

Other additional layers, both textile and polymeric, may also be provided for between the various layers, without departing from the scope of protection outlined by the attached claims.

Figure 3:
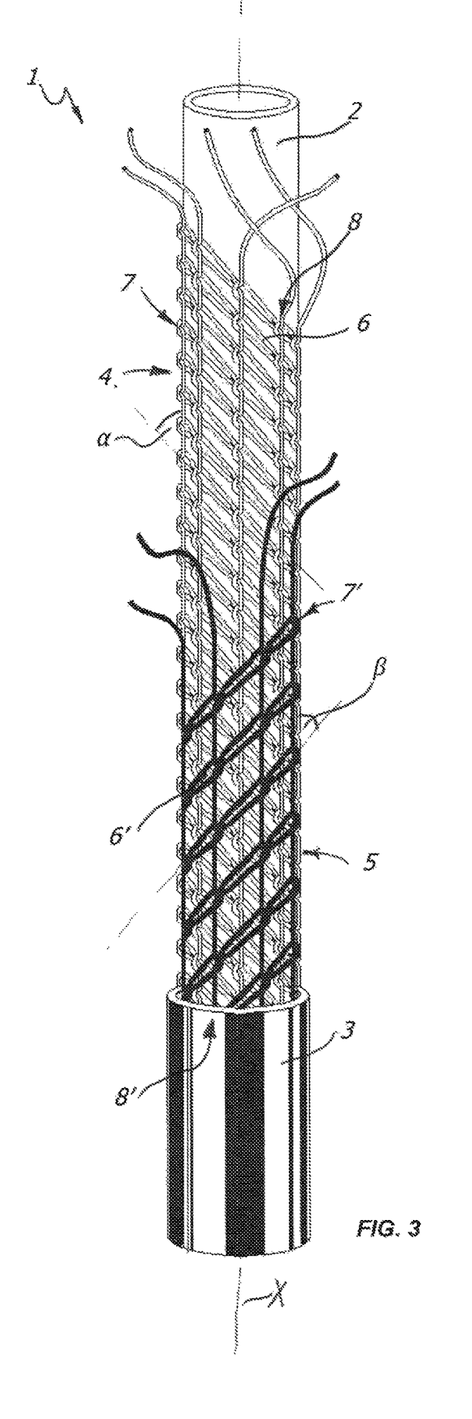
FIG. 3 is a schematic view of an embodiment of a reinforced flexible hose 1.
Figure 4:
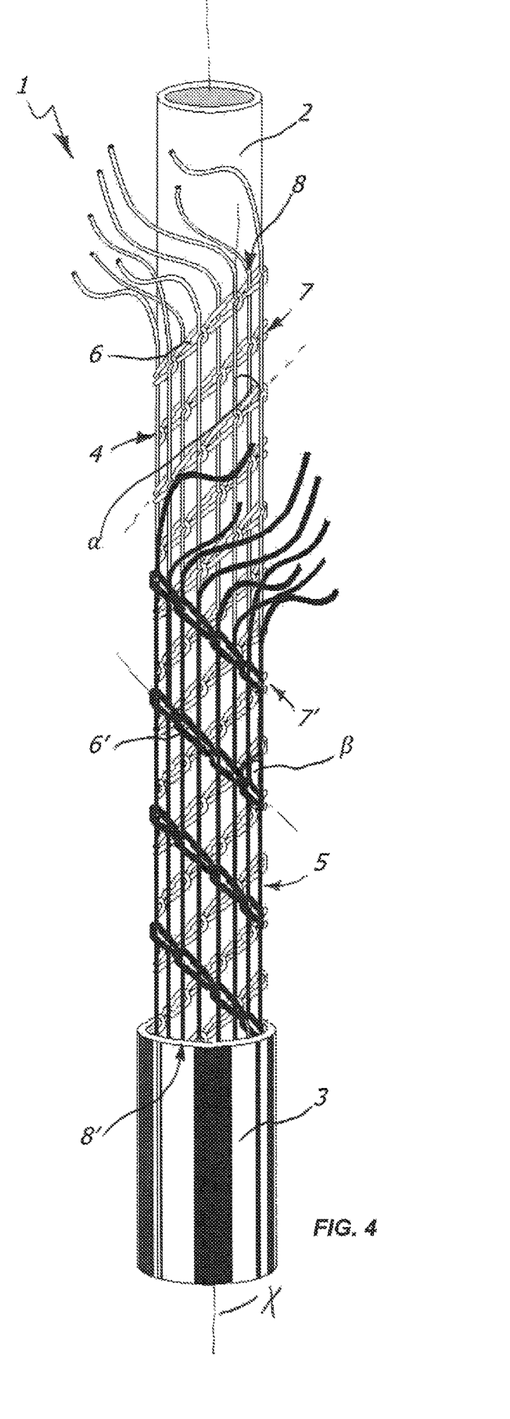
FIG. 4 is a schematic view of a further embodiment of a reinforced flexible hose 1.
Figures 5A, 5B:
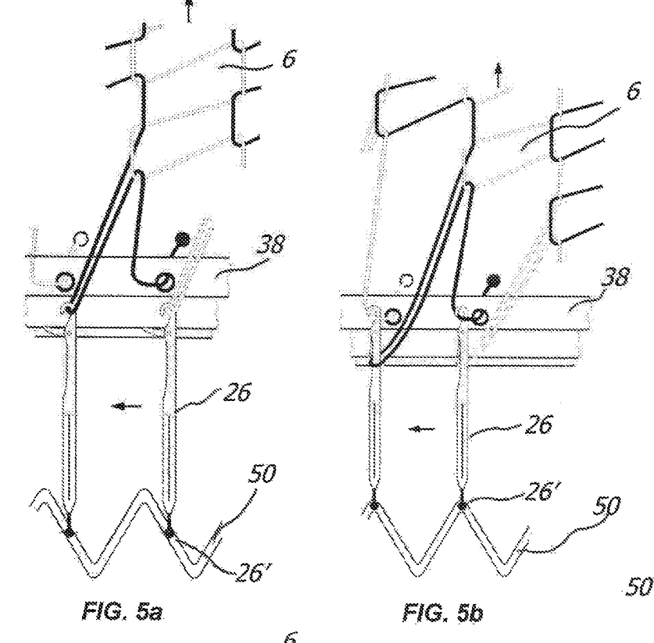
FIGS. 5a to 5e are particular schematic views of the obtainment of a knitted layer by means of a knitting station 12.
Figure 5C:
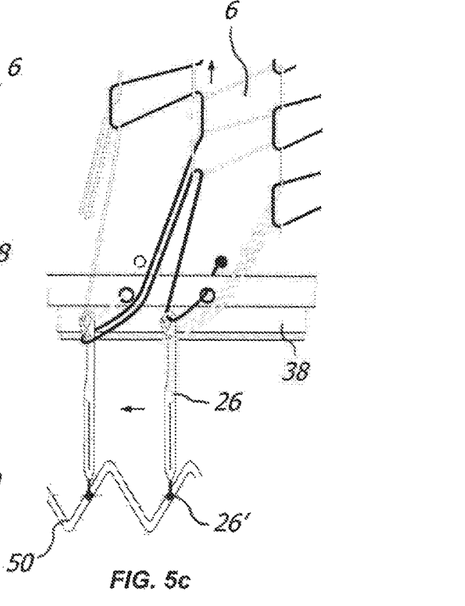
Figure 5D:
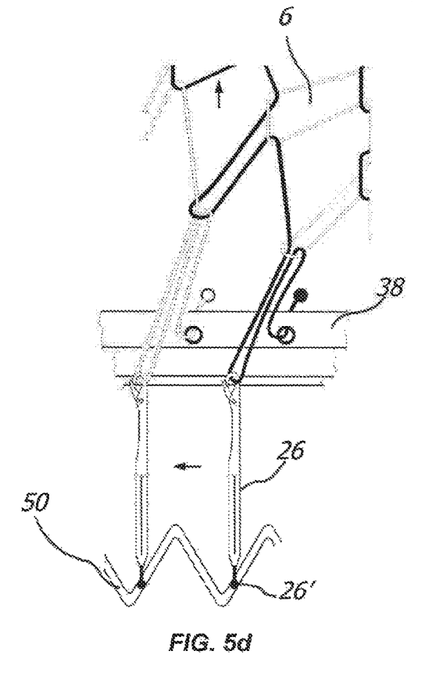
Figure 5E:
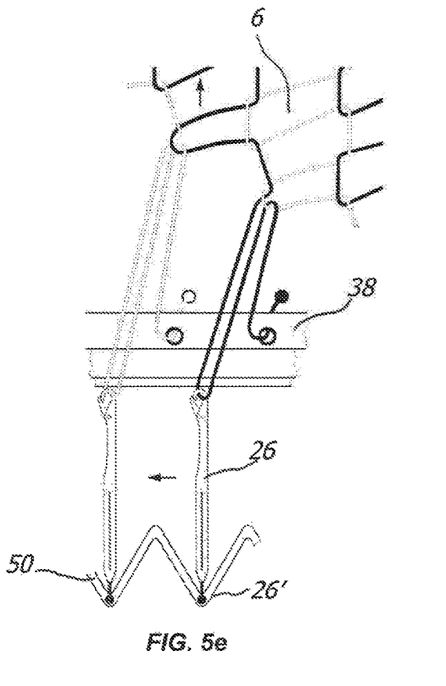

In a preferred but non-exclusive embodiment, for example illustrated in FIGS. 3 and 4, the textile layers 4, 5 may be of the knitted type with chain stitches of the tricot type, indicated with 6 for the first textile layer 4 and 6' for the second textile layer 5. Both textile layers 4, 5 may have rows of stitches, indicated with 7 for the first textile layer 4 and with 7' for the second textile layer 5, and courses of stitches respectively indicated with 8, 8'.

The courses of stitches 8 of the first textile layer 4 may all be substantially parallel to each other, same case applying to the courses of stitches 8' of the second textile layer 5, and they may all be substantially parallel to the axis X of the hose 1.

The rows of stitches 7, 7' of the textile layers 4, 5 may instead have opposite inclinations $\alpha$, $\beta$ with respect to the axis X of the hose, and preferably equal.

In a possible embodiment of the flexible hose 1, for example illustrated in FIG. 3, the courses of stitches 8 of the first textile layer 4 may be equally spaced from the courses of stitches 8' of the second textile layer 5. Thanks to such characteristic, the courses of stitches 8, 8' will be uniformly spaced apart along the periphery of the load-bearing layer 2, so as to considerably raise the burst pressure of the hose 1.

In an alternative embodiment, illustrated for example in FIG. 4, the courses of stitches 8, 8' may also be arranged adjacent or superimposed with respect to each other, with the courses of stitches 8 of the first layer 4 adjacent or superimposed to the courses of stitches 8' of the second layer 5.

The flexible hose according to the invention will be extremely simple, inexpensive and quick to manufacture, but still maintaining optimal anti-torsional and burst pressure properties.

Basically, the hose according to the invention has anti-torsional and burst pressure properties comparable to those of hoses with double knitted layer of the prior art, with production speeds similar to those of hoses with single knitted layer of the prior art.

The courses of stitches of both knitted textile layers may be substantially parallel to the axis, so as to simplify, quicken and economise the manufacturing of the hose to the maximum.

The flexible hose 1 may suitably also be particularly, even though not exclusively, used as an irrigation hose for domestic purposes, for example like the so-called garden hose.

On the other hand, depending on the configuration of the textile layers, and in particular—even though not exclusively—the pitch and/or the amount per linear metre and/or the textile yarns count, the flexible hose 1 may reach relatively high burst pressure, and thus be suitable for use for various purposes.

Advantageously, the first and the second material may be of the thermoplastic polymer or elastomeric type.

The first and the second polymeric or elastomeric material may be different or identical to each other. Advantageously, the first and the second polymeric or elastomeric material may be compatible with each other.

The first and the second material may suitably be both polymeric with a plasticised PVC (polyvinyl chloride)-based matrix. Both the first polymeric or elastomeric material may have a Shore A hardness measured according to ASTM D2240 standard (3") comprised between 40 ShA and 100 Sh A, preferably comprised between 60 ShA and 90 ShA and even more preferably comprised between 65 ShA and 85 ShA.

Figure 1:
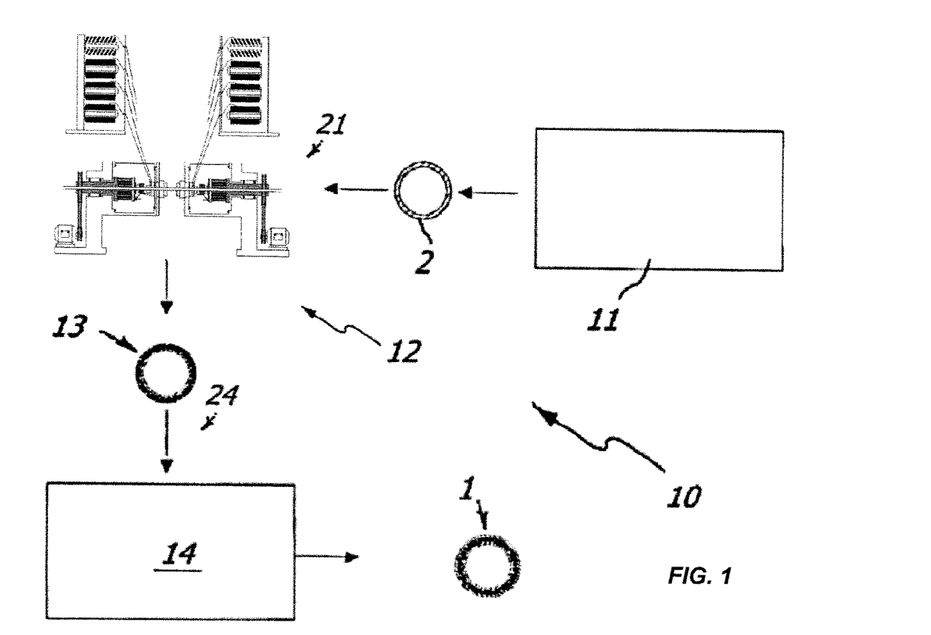
FIG. 1 is a schematic view of an embodiment of a line 10 for manufacturing the reinforced flexible hose 1.

The flexible hose 1 may be manufactured by means of the line 10 illustrated in FIG. 1. The line 10, will enable the continuous manufacturing of the hose 1.

Initially, upon introducing plasticised PVC into a first extruder 11, the inner tubular layer 2, designated to act as the load-bearing layer, will be extruded, in a per se known manner.

Then, the load-bearing layer will be introduced into a knitting station 12, suitable for obtaining the first and the second textile layer 4, 5 on the inner load-bearing tubular layer 2.

Lastly, the reinforced load-bearing tubular element 13, thus obtained, will be introduced into a second extruder 14, loading it from above with plasticised PVC, so as to extrude—in a per se known fashion, on the upper surface of the reinforced load-bearing tubular element 13—the cover layer 3, obtaining the finished hose 1 at the outlet 24 of the second extruder 14.

Figure 2:
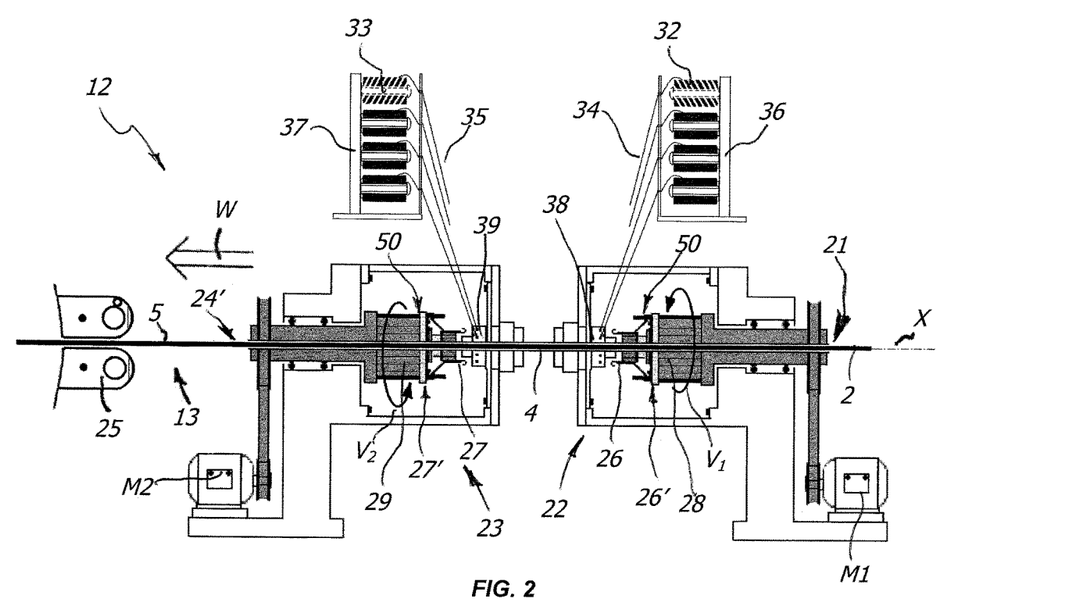
FIG. 2 is a schematic view of an embodiment of a knitting station 12.

With the aim of obtaining textile layers 4, 5, the knitting station 12 may comprise an inlet 21 for the inner load-bearing tubular layer 2 coming from the first extruder 11, a first and a second circular knitting unit 22, 23 arranged in series and an outlet 24' for the reinforced load-bearing tubular element 13, designated for the second extruder 14.

The arrow W in FIG. 2 indicates the direction of advancement of the load-bearing layer 2 through the circular knitting station 12, and it also defines a longitudinal axis coincident with the axis X of the hose. Externally to the knitting station 12 there may be provided per se known means 25 for drawing the hose along the advancement line X.

Each of the circular knitting units 22, 23 may have a set of needles 26, 27, fixed to a respective needle-holder cage 28, 29, which are operatively connected to respective distributors 38, 39 and, by means of per se known tensioning and idler means, to a respective set of reels 32, 33 of the textile yarn 34, 35, mounted on unwinding reel-holder supports 36, 37, referred to as creels in the technical jargon.

The number of reels and the number of needles may vary. The two circular knitting units 22, 23 may preferably have an equal number of needles and corresponding reels, for example eight per set.

In a preferred but non-exclusive embodiment, a needle may correspond to each reel, and the number of needles may correspond to the number of rows of stitches 7, 7' to be obtained on the inner load-bearing tubular layer 2.

In use, as illustrated for example in FIGS. 5a to 5e, the needles 26, 27 may pick up the respective textile yarn 34, 35 from the corresponding reel 32, 33 to intertwine it with the adjacent yarns to form stitches of the tricot type.

The needles 26, 27 may be mounted on the respective needle-holder supports 28, 29 peripherally around the axis X, so as to form—on the outer surface of the inner load-bearing tubular layer 2 initially advancing on the textile layer 4 and subsequently on the textile layer 5.

Figure 6:
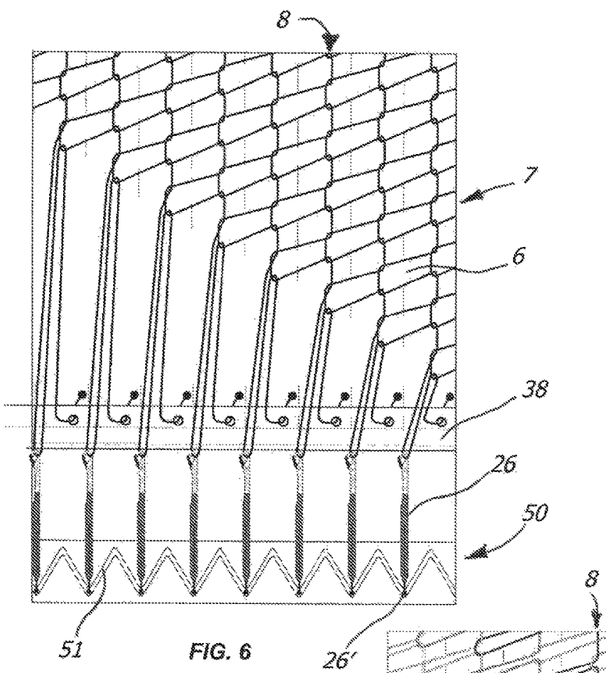
FIG. 6 is a schematic view of some components of a first embodiment of the knitting station 12.
Figure 7:
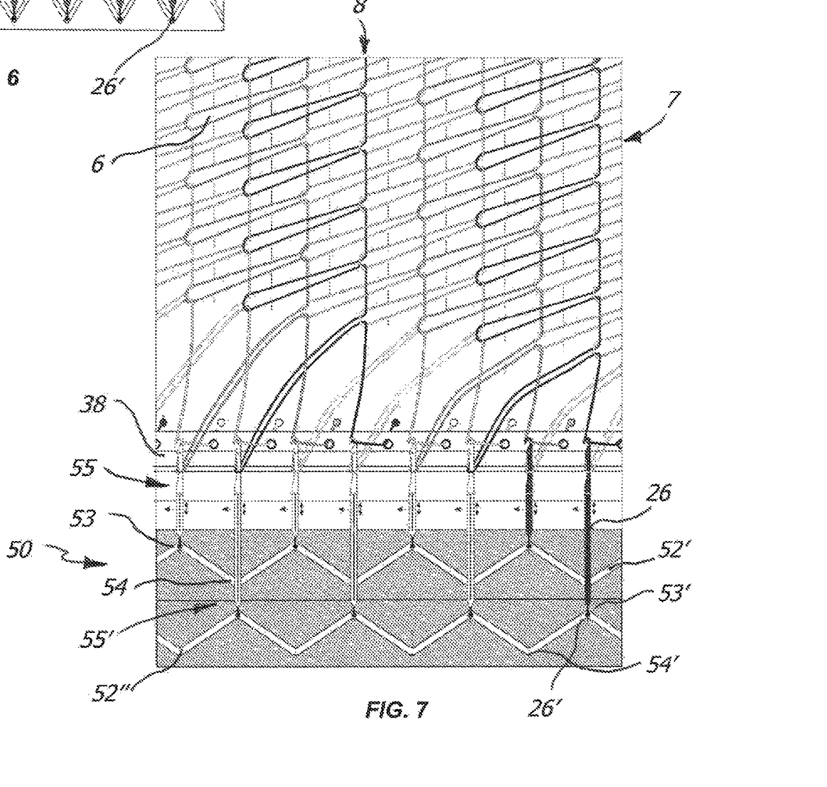
FIG. 7 is a schematic view of some components of a further embodiment of the knitting station 12.

As particularly illustrated in FIGS. 2, 6 and 7, the needles 26, 27 may have respective ends 26', 27' operatively coupled with cam means, generally indicated with 50, to promote the reciprocating motion thereof along respective directions substantially parallel to the longitudinal axis X. It is clear that even though FIGS. 6 and 7 show details regarding the circular knitting unit 22, such details are identical for the knitting unit 23.

Depending on the configuration of the cam means 50 and the operative coupling with the needles 26, 27, different configurations of the knitted textile layer with chain stitches of the tricot type may be provided for.

For example, as illustrated in FIG. 6, in a first embodiment, the cam means 50 may include a single cam 51 with zig-zag pattern, while all needles 26, 27 may have the rear end 26', 27' operatively coupled with the cam 51. In this case, there will be obtained knitted textile layers with chain stitches of the tricot type with "plain stitch".

Furthermore, as illustrated in FIG. 7, in another embodiment, the cam means 50 may include a pair of juxtaposed cams 52', 52" with zig-zag pattern, mutually staggered so that the peaks 53, 53' of a cam correspond to the bottoms 54, 54' of the other cam and vice versa. In this case, a first group 55 of needles 26, 27 may have a rear end 26', 27' operatively coupled with one of the cams, for example cam 52', while a second group 55' of needles 26, 27 may have a rear end 26', 27' operatively coupled with the other of the cams, for example cam 52". In this case, there will be obtained knitted textile layers with chain stitches of the tricot type with "lock stitch".

With the aim of obtaining the textile layers 4 and 5 as described above, the cam means 50, the distributors 38, 39, the reels 32, 33 and reel-holder creels 36, 37 may be standstill, i.e. stationary, while the needles 26, 27 may rotate around the axis X.

Thus, each needle 26, 27 may selectively act on all textile yarns 34, 35. In so doing, for example as illustrated in FIGS.

5a to 5e, the needle picks up the yarn and draws it in rotation, so as to incline the rows of stitches 7, 7'.

In order for the rows of stitches 7, 7' of the textile layers 4, 5 to have opposite inclinations α, β, the needles 26, 27 will rotate with opposite directions $V_1$, $V_2$. Thus, the first circular knitting unit 22 will obtain the first textile layer 4 with rows of stitches 7 inclined in one direction $V_1$ with respect to the axis X, while the second circular knitting unit 23 will obtain, on the first layer 4, the second textile layer 5 with rows of stitches 7' inclined in the opposite direction $V_2$.

In order to promote the rotation of the needles 26, 27 there may be provided for actuator means, for example a motor with a relative belt M1, M2, acting on the needle-holder supports 28, 29 of the needles 26, 27. In FIG. 2, the rotating parts are coloured grey for ease of view.

Thus, this will enable the continuous production of the reinforced flexible hose 1 in a simple and quick manner.

As a matter of fact, contrary to what occurs in the prior art, the only mobile components of the circular knitting units are the needles (by means of the relative supports), this quickening the production of the flexible hose 1 to the maximum. This characteristic simultaneously minimises maintenance needs.

Furthermore, this also minimises the vibrations of the knitting station while operating, this facilitating the homogeneous distribution of textile yarns along the periphery of the load-bearing layer.

Even though FIG. 2 shows a knitting station 12 in which the two sets of needles 26 and 27 are facing each other, it is clear that the needles 26, 27 may operate in the same direction without departing from the scope of protection of the attached claims.

The inclination of the rows of stitches 7, 7', will be adjusted by the rotation speed of the needles 26, 27. In a preferred embodiment, the rotation speeds thereof may be identical, so that the inclinations of the rows of stitches 7, 7' will also be identical.

The cam means 50 of both knitting units 22, 23 may be identical to each other, so that the configuration of the textile layers 4, 5 is identical.

It is clear that both textile layers 4, 5 do not necessarily have to be chain stitches of the tricot type.

As a matter of fact, according to the invention, even just one of them can be of the chain stitches of the tricot type, as long as it has an inclination opposite to that of the rows of stitches of the other.

Figure 8:
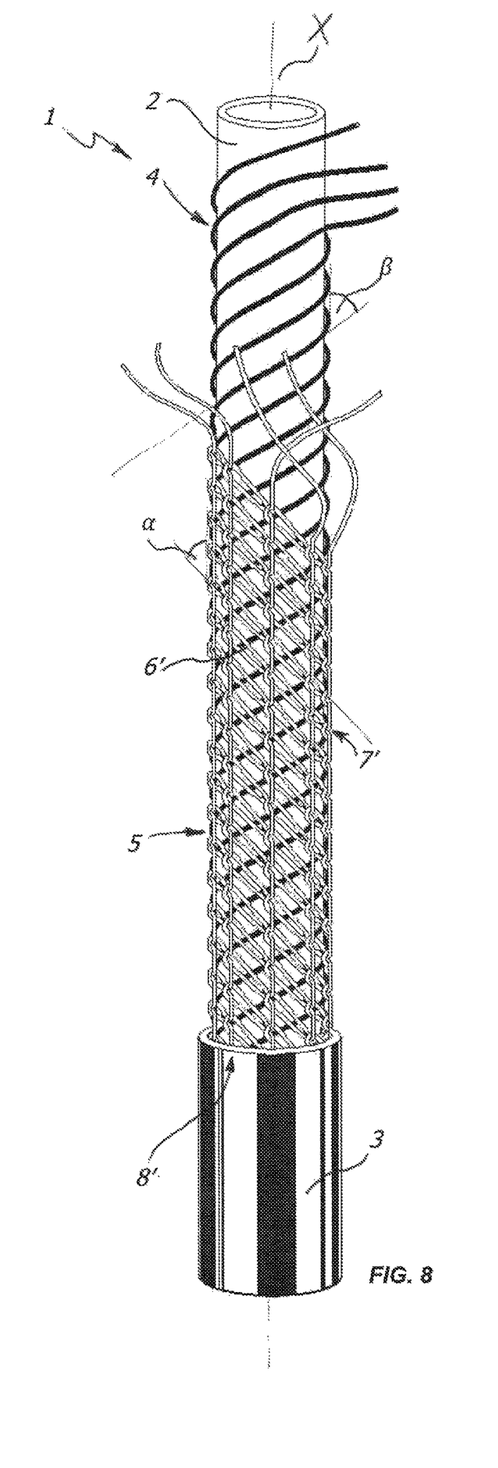
FIG. 8 is a schematic view of a further embodiment of a reinforced flexible hose 1.

For example, as illustrated in FIG. 8, the textile layer 4 may be of the knitted type with chain stitches of the tricot type with all courses of stitches 8 substantially parallel to each other and to the axis X of the hose 1 and rows of stitches 7 with inclination α, while the textile layer 5 may be a spiraled layer with inclination β opposite to the inclination α.

Figure 9:
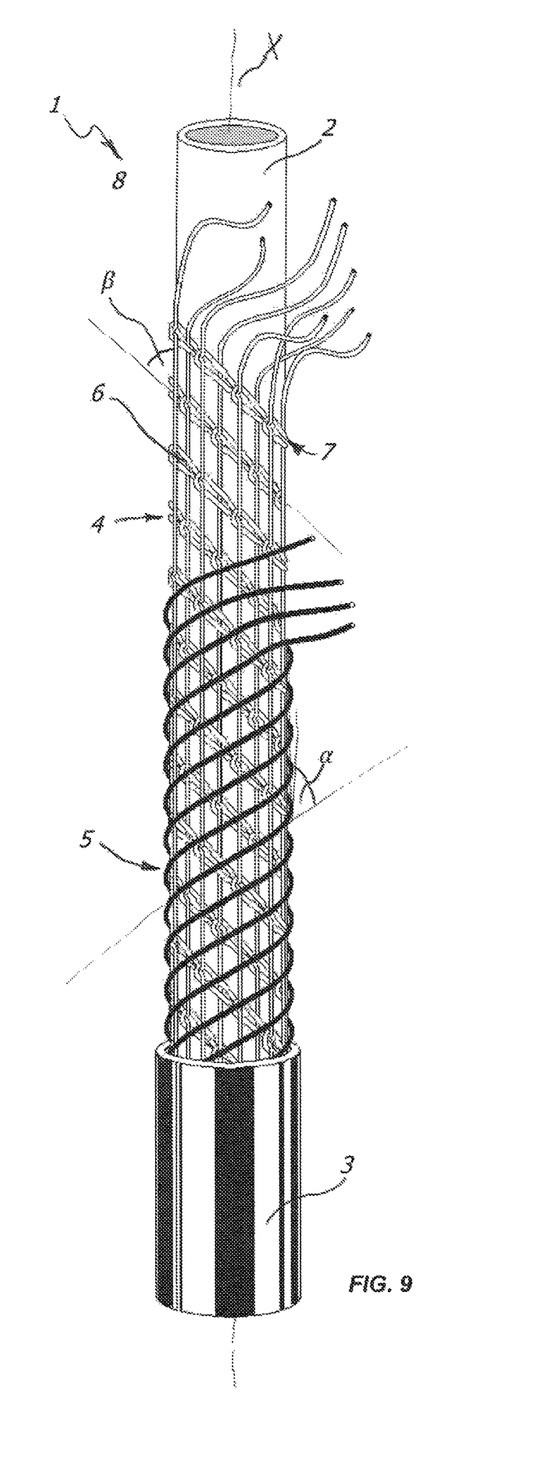
FIG. 9 is a schematic view of a further embodiment of a reinforced flexible hose 1.

On the other hand, as illustrated in FIG. 9, the textile layers may be inverted for example with respect to the previous one.

It is clear that should the flexible hoses 1 be configured like in FIGS. 8 and 9, the line 10 will include a circular knitting unit and a spiraling unit, the latter being per se known to a man skilled in the art.

In another example, not illustrated in the figures, the textile layer 4 (or the textile layer 5) may be of the knitted type with chain stitches of the tricot type with all courses of stitches 8 substantially parallel to each other and to the axis X of the hose 1 and rows of stitches 7 with inclination α, while the textile layer 5 (or the textile layer 4) may be a cross-hatched layer or knotted layer with inclination β opposite to the inclination α.

It is clear that in case of the cross-hatched or knotted or braided textile layer having two inclined and opposite portions with respect to the axis X, whose one first portion is inclined in a direction matching the inclination α and a second portion opposite thereto, the inclination β is the inclination of the latter.

Generally, should one of the textile layers 4 or 5 be of the knitted type with chain stitches of the tricot type having all rows of stitches 8 substantially parallel to each other and to the axis X of the hose 1 and rows of stitches 7 with inclination α, the other of the textile layers 4 or 5 will at least partly have inclination β opposite to the former so as to avoid unwanted torsions of the hose.

It is also clear that between the textile layers 4, 5 there may be interposed one or more polymeric or elastomeric tubular layers, or that above, beneath or between them there may be provided one or more further textile layers, without departing from the scope of protection of the attached claims.

It is also clear that the textile layers 4, 5 may be intertwined with respect to each other, i.e. integrally joined in a manner such that a yarn of a textile layer is intertwined with a yarn of the other textile layer, without departing from the scope of protection of the attached claims.

In light of the above, it is clear that the invention attains the pre-set objectives.

The flexible hose 1, the line and method for manufacturing it are susceptible to numerous modifications and variants all falling within the inventive concept outlined by the attached claims. All details can be replaced by other technically equivalent elements, and the materials can be different depending on the needs, without departing from the scope of protection defined by the attached claims.

It is also clear that in a further aspect, there may be provided for a flexible hose reinforced with at least one polymeric or elastomeric inner load-bearing layer, at least one polymeric or elastomeric outer layer and a single textile layer, interposed therebetween, knitted textile layer with chain stitches of the tricot type in which the courses of stitches are substantially parallel to each other and to the axis of the hose and the rows of stitches are inclined with respect to the axis of the hose.

The invention claimed is:

1. A flexible hose reinforced with at least two superimposed textile layers comprising:
   an inner load-bearing tubular layer defining a longitudinal axis made of a first polymeric or elastomeric material;
   an outer cover layer made of a second polymeric or elastomeric material; and
   a first and a second textile layer mutually superimposed and interposed between said inner and said outer layer;
   wherein said first textile layer and said second textile layer at least partly have a respective first and second predetermined inclinations, said first and said second predetermined inclinations being opposite to each other with respect to said longitudinal axis; and
   wherein at least one of said first and said second textile layer is a knitted textile layer with chain stitches of tricot type having courses of stitches each defined by straight segments that are substantially parallel to each other and to said longitudinal axis, and wales of stitches each defined by loops having said first or said second predetermined inclination.

2. The flexible hose according to claim 1, wherein one of said first and said second textile layers is said knitted textile layer with the chain stitches of the tricot type having the courses of stitches each defined by the straight segments that are substantially parallel to each other and to said longitudinal axis and the wales of stitches each defined by the loops having said first or said second predetermined inclination, and wherein the other one of said first and said second textile layer is a spiralled textile layer defined by a strand extending spirally around said longitudinal axis.

3. The flexible hose according to claim 1, wherein both said first and said second textile layers are knitted textile layers with the chain stitches of the tricot type having courses of stitches each defined by the straight segments that are substantially parallel to each other and to said longitudinal axis and the wales of stitches each defined by the loops having said first or said second predetermined inclination.

4. The flexible hose according to claim 3, wherein the courses of stitches of the first textile layer are equally spaced apart from the courses of stitches of the second textile layer.

5. The flexible hose according to claim 3, wherein the courses of stitches of the first textile layer are superimposed or adjacent to the courses of stitches of the second textile layer.

6. The flexible hose according to claim 1, wherein said first and said second predetermined inclinations are identical.

7. The flexible hose according to claim 1, wherein said first polymeric or elastomeric material and said second polymeric or elastomeric material are selected from the group consisting of plasticized PVC, an elastomer, or a thermoplastic elastomer (TPE).

8. The flexible hose according to claim 1, wherein said first polymeric or elastomeric material and said second polymeric or elastomeric material have a Shore A hardness measured according to ASTM D2240 standard comprised between 40 ShA and 100 ShA.

9. The flexible hose according to claim 1, wherein said first polymeric or elastomeric material and said second polymeric or elastomeric material are identical.

10. The flexible hose according to claim 1, wherein said first polymeric or elastomeric material and said second polymeric or elastomeric material are compatible with each other.

11. The flexible hose according to claim 1, wherein said inner load-bearing tubular layer is adapted to come into contact with a liquid to be transferred, said outer cover layer being adapted to be grasped by a user.

12. A method of manufacturing a flexible hose reinforced with at least two superimposed textile layers, the method sequentially comprising the steps of:
    a) providing an inner load-bearing tubular layer defining a longitudinal axis made of a first polymeric or elastomeric material;
    b) providing, on said inner load-bearing tubular layer, a first textile layer;
    c) providing, over said first textile layer, a second textile layer to obtain a reinforced load-bearing tubular element;
    d) providing, over said reinforced load-bearing tubular element, an outer cover layer made of a second polymeric or elastomeric material to obtain the reinforced load-bearing tubular element;
    wherein said first textile layer and said second textile layer are made so as to at least partly have a respective first and second predetermined inclination, said first and second inclination being opposite to each other with respect to said longitudinal axis; and
    wherein at least one of said first and said second textile layer is a knitted textile layer with chain stitches of tricot type having courses of stitches each defined by straight segments that are substantially parallel to each other and to said axis and wales of stitches each defined by loops having said first or said second predetermined inclination.

13. The method according to claim 12, wherein said step a) of providing said inner load-bearing tubular layer comprises a step of extruding said first polymeric or elastomeric material.

14. The method according to claim 12, wherein said step d) of providing the outer cover layer comprises a step of extruding said second polymeric or elastomeric material.

* * * * *